(12) United States Patent
Cohen

(10) Patent No.: US 11,427,940 B2
(45) Date of Patent: Aug. 30, 2022

(54) METHODS AND SYSTEMS FOR TRIGGERED ON-LOOM FABRIC INSPECTION

(71) Applicant: USTER TECHNOLOGIES LTD., Caesarea (IL)

(72) Inventor: Shmuel Cohen, Kadima (IL)

(73) Assignee: USTER TECHNOLOGIES LTD., Caesarea (IL)

( * ) Notice: Subject to any disclaimer, the term of this patent is extended or adjusted under 35 U.S.C. 154(b) by 263 days.

(21) Appl. No.: 16/767,162

(22) PCT Filed: Nov. 25, 2018

(86) PCT No.: PCT/IB2018/059275
§ 371 (c)(1),
(2) Date: May 27, 2020

(87) PCT Pub. No.: WO2019/106509
PCT Pub. Date: Jun. 6, 2019

(65) Prior Publication Data
US 2020/0385899 A1    Dec. 10, 2020

Related U.S. Application Data

(60) Provisional application No. 62/591,796, filed on Nov. 29, 2017.

(51) Int. Cl.
*G06K 9/00* (2022.01)
*D03J 1/24* (2006.01)
*D03D 49/00* (2006.01)
*D03D 51/44* (2006.01)
*G06T 7/00* (2017.01)

(52) U.S. Cl.
CPC ............ *D03J 1/24* (2013.01); *D03D 49/00* (2013.01); *D03D 51/44* (2013.01); *G06T 7/0004* (2013.01); *G06T 2207/30124* (2013.01)

(58) Field of Classification Search
CPC . D03J 1/24; D03J 1/007; D03D 49/00; D03D 51/44; D03D 51/007; G06T 7/0004; G06T 2207/30124; G06T 7/00; H04N 5/225; H04N 5/232
USPC ........................................................ 382/111
See application file for complete search history.

(56) References Cited

U.S. PATENT DOCUMENTS

| 4,953,596 | A | * | 9/1990 | Takegawa | .......... | D03D 47/3033 139/55.1 |
| 2001/0012381 | A1 | * | 8/2001 | Sari-Sarraf | ............ | G06T 7/001 382/111 |
| 2014/0036061 | A1 | * | 2/2014 | Cohen | .................... | D03J 1/007 348/92 |

(Continued)

FOREIGN PATENT DOCUMENTS

| JP | H0657596 A | * | 3/1994 |
| JP | H0657596 A |   | 3/1994 |

*Primary Examiner* — Stephen P Coleman
(74) *Attorney, Agent, or Firm* — AlphaPatent Associates, Ltd; Daniel J. Swirsky

(57) ABSTRACT

On-loom fabric inspection system (500) including an imaging device (522) configured to collect images of a weaving area (518) of a loom (502). An image-capture trigger-mechanism (529) triggers the imaging device (522) to capture images at required instants during the weaving cycle. An image processor (524) receives data from the imaging device (522) and further detects irregularities in the data.

20 Claims, 7 Drawing Sheets

(56) References Cited

U.S. PATENT DOCUMENTS

2016/0177481 A1* 6/2016 Wolf .................. H04N 5/77
　　　　　　　　　　　　　　　　　　　700/140

* cited by examiner

METHODS AND SYSTEMS FOR TRIGGERED ON-LOOM FABRIC INSPECTION

CROSS-REFERENCE TO RELATED APPLICATIONS

This application is a U.S. National Phase Application under 35 U.S.C. 371 of International Application No. PCT/IB2018/059275, which has an international filing date of Nov. 25, 2018, and which claims priority and benefit from U.S. Provisional Patent Application No. 62/591,796, filed Nov. 29, 2017, the contents and disclosure of which are incorporated herein by reference in their entirety.

TECHNICAL FIELD

The invention relates to systems and methods for on-loom fabric inspection. In particular, the invention relates to triggering image-capture devices at required instants during the weaving cycle.

BACKGROUND ART

Weaving is the most popular way of fabric manufacturing. It is primarily done by interlacing two orthogonal sets (warp and weft) of yarns in a regular and recurring pattern. Weaving involves repeating in sequence the operations of shedding, picking, and battening. All these processes are typically carried out by a loom. Shedding is the process by which warp yarns are raised or lowered to produce a space, known as the shed, through which a filler yarn may be passed. Picking is the process of inserting a filler yarn through the shed, such that it intersects the warp threads. Battening is the process of pressing the filler yarn against a fell, where the newly woven fabric is formed.

A number of faults occur in fabric during the weaving process. Woven fabric faults include cut yarn, double yarn, hole, float, stain, etc. The quality of woven fabric depends upon the number of defects left in the fabric after the manufacturing process. Defects developing during any of the above-mentioned processes determine the quality of the finished fabric. Typically, the finished fabric is inspected for faults according to industry standards. For example, in the standard four-point system of fabric inspection, penalty points are given for detected defects. The size of the penalty depends also upon the length of the defect with 1 penalty point being given to defects of 3 inches or less, 2 penalty points being given to defects of between 3 to 6 inches, 3 penalty points being given to defects of between 6 to 9 inches and 4 penalty points being given to defects of above 9 inches. The quality of the batch of cloth is described by the number of penalty points per 100 yards of inspected cloth, with up to 40 points being generally considered an acceptable defect rate. Apart from the four-point system described above, other standards, such as the more complicated ten-point system or the Dallas System for knitted fabric, may be used to measure the quality of cloth.

Conventionally, manual inspection is done for the finished fabric. Through manual inspection, generally, a sample size of at least ten percent of a roll of finished fabric is inspected. Faults in uninspected rolls are typically left undetected until the cloth is sold on. Furthermore, although such defect inspections are standardized as far as possible, it is noted that they depend upon the subjective assessment of the inspector. What one inspector may consider being a defect, another inspector may consider being acceptable. Accordingly, the same roll of cloth may be assessed very differently by different inspectors regardless of its actual quality.

The use of technology has improved the way of fault detection during various stages of a fabric manufacture. The highly efficient techniques of image capturing and image analysis enable the inspection of a woven cloth in a standardized manner.

By way of example, U.S. Pat. No. 4,582,095 to Kronholm titled, "Fabric monitoring means for power looms" describes a power loom for the manufacture of woven fabrics, which is provided with a computerized pattern recognition system for monitoring the warp, the fabric, the edge of the fabric, and the density of the weft. Although Kronholm's device includes a video camera and computerized image processing means, Kronholm only captures images near an edge of the fabric. It is particularly noted that Kronholm's device does not capture images of the shed region of the loom.

In another example, United States Patent Application Number 20040133297 to Vergote titled, "Method for optimizing a textile production process and devices applying this method" describes a method for optimizing a textile production process by visualizing fabric-determining elements on a machine screen by means of at least one image. It is particularly noted that Vergote's method captures images of the loom itself but fails to image the fell region or the woven fabric thereupon.

Further, United States Patent Application Number 20050031191 to Venkatachalam titled, "Methods and apparatus for inspection of lines embedded in highly textured material" describes a machine vision inspection system that is programmed and operated to identify one or more lines appearing in a surface of a workpiece. It is particularly noted that Venkatachalam's machine does not provide any on-loom inspection but only inspects the completed fabric.

Still further, U.S. Pat. No. 6,256,091 to Kobayashi titled, "Transparent substrate mounting platform, transparent substrate scratch inspection device, transparent substrate bevelling inspection method and device, and transparent substrate inspection method" describes a system for inspecting scratches in a crystal blank, but does not describe any on-loom inspection of fabric manufacture.

SUMMARY OF INVENTION

In view of the limitations in the prior art, the need remains for improved technology to detect faults through the on-loom fabric inspection system in fast and cost-effective manner. The systems and methods described herein come to address this need.

In one aspect of the invention, an on-loom fabric inspection system is presented comprising: at least one imaging device configured to collect images of at least one section of a weaving area of a loom; at least one image-capture trigger-mechanism operable to trigger the imaging device to capture an image at a required instant during the weaving cycle; and at least one image processor configured and operable to receive data from the imaging device and further to detect irregularities in the data.

Where appropriate, the image-capture trigger-mechanism may comprise at least one heald-detector configured and operable to detect relative positions of at least two heald frames of the loom. Optionally, the heald-detector comprises at least one sensor selected from the group consisting of: mechanical sensors, an electrical sensors, optical sensors and combinations thereof.

Additionally or alternatively, the image-capture trigger-mechanism comprises at least one timer operable to synchronize image capture with the weaving cycle. Optionally, the timer comprises a stroboscope timed to expose the weaving area at the required instant in the weaving cycle. Where appropriate, the required instant coincides with the moment that at least two heald frames are aligned. Alternatively, the required instant coincides with the moment that the shed is open.

Where appropriate, the imaging device comprises a camera having an object distance equal to the optical distance from the camera to a plane of a fell region of the weaving area. Additionally or alternatively, the imaging device comprises a camera having an object distance equal to the optical distance from the camera to an upper warp yarn plane of a shed region of the weaving area.

In other aspects, an on-loom fabric inspection system is disclosed comprising an image capturing device configured to collect images of a weaving area of a loom; wherein the weaving area comprises a shed region, a woven fabric region and a fell region. The system further comprises a detector to detect when heald frames are aligned with each other and trigger the image capturing device to capture images of the weaving area at that instant. Optionally, the system also comprises at least one image processor configured to process data pertaining to the images and to detect irregularities in image data indicating the occurrence of weaving faults.

Accordingly, a camera may be configured to capture images of the weaving area when the warp yarns in the shed are coplanar with the fell region and the newly woven fabric. This enables a single object distance to be used to image both regions allowing irregularities to be detected in both. In certain embodiments, an image capture device is further configured to capture an image having an object plane in line with upper warp threads of the shed and the images would be captured twice in each cycle in order to image both sets of warp threads.

Typically, the section of the weaving area comprises all of a shed region, a woven fabric region and a fell region.

In some examples, the on-loom fabric inspection system further comprises an output mechanism operable to provide information to a user regarding functioning of the loom.

Optionally, the on-loom fabric inspection system further comprises an output mechanism operable to provide information selected from a group consisting of images, graphical representations, numbers and text pertaining to functioning of the loom.

In another aspect of the invention, a method is taught for inspecting woven fabric. The method comprises providing at least one on-loom fabric inspection system including: at least one imaging device configured to collect images of at least one section of a weaving area of a loom; at least one image-capture trigger-mechanism; and at least one image processor. The method further comprises steps including: selecting a required instant during the weaving cycle; the at least one image-capture trigger-mechanism triggering the imaging device at the required instant during the weaving cycle; the at least one imaging device capturing an image of at least one section of a weaving area at the required instant; transferring image data to the at least one image processor; and the at least one image processor analyzing the image data for irregularities indicative of weaving faults.

Optionally, the method may also include providing a quality index for a batch of woven fabric. Additionally or alternatively, the method may also include adjusting the loom to correct the weaving faults. Where appropriate, the method may also include comparing deviation of weft-spacing in the fell region from a desired weft-spacing function.

BRIEF DESCRIPTION OF DRAWINGS

For a better understanding of the embodiments and to show how the invention may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice.

In the accompanying drawings:

FIG. 1 illustrates a schematic side view of an exemplary configuration of an on-loom fabric inspection system integrated onto a loom;

FIG. 2 illustrates the schematic side view of the fabric inspection system of FIG. 1 with an image capturing device focused to take images of a fell region and a newly woven fabric;

FIG. 3 illustrates the schematic side view of the fabric inspection system of FIG. 1 with an image capturing device focused to take images of warp yarns in a shed;

FIG. 4 is a block diagram representing the main components of a first embodiment of an on-loom fabric inspection system;

FIG. 5 illustrates a schematic side view of an exemplary configuration of an on-loom fabric inspection system of the invention;

FIG. 6 illustrates the schematic side view of the fabric inspection system of FIG. 5 with an image capturing device focused to take images of a weaving area;

FIG. 7 is a flowchart representing a method for detecting defects in woven fabric using the on-loom fabric inspection system; and FIG. 8 is a representation of one frame imaged by the image capturing device of the on-loom fabric inspection system.

DESCRIPTION OF EMBODIMENTS

Figure 1:
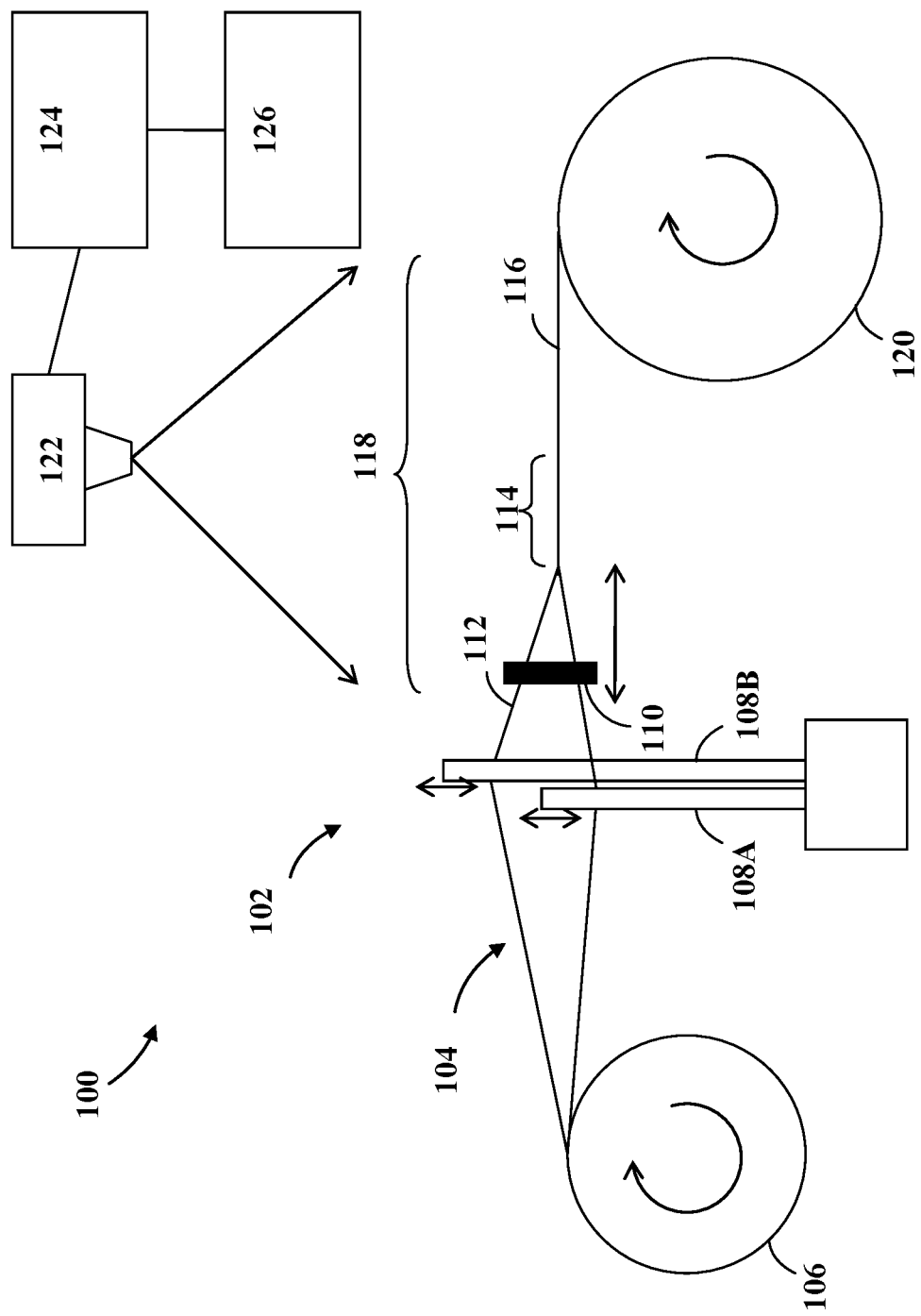

Aspects of the present disclosure relate to systems and methods for on-loom fabric inspection.

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As appropriate, in various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a nonvolatile storage, for example, a magnetic hard disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting. Accordingly, various embodiments may omit, substitute, or add various procedures or components as appropriate. For instance, the method steps may be performed in an order different from described, and various steps may be added, omitted or combined. In addition, aspects and components described with respect to certain embodiments may be combined in various other embodiments.

FIG. 1 represents an exemplary configuration of an on-loom fabric inspection system 100. A loom 102 includes a yarn roll 106, a take-up roll 120, a pair of heald frames 108A and 108B and a reed 110. An array of warp yarns 104 are threaded through the heald frames 108A and 108B and the reed 110. The heald frames 108A and 108B are made of wood or metal such as aluminium. They carry a number of heald wires (not shown) through which the ends of the warp yarns pass. The heald frames 108A and 108B are configured to raise and lower the warp yarns, thereby producing a shed 112 through which a filler yarn (not shown) may be inserted using some filling insertion mechanism (not shown) such as a shuttle, rapier, jet or the like. The reed 110 is a metallic comb used to batten the filler yarn against newly woven fabric 116. It also helps to maintain the position of the warp yarns 104. The woven fabric 116 is collected by the take-up roll 120 as it is produced.

The on-loom fabric inspection system 100 is configured to monitor a weaving area 118 including the newly woven fabric 116, the shed 112 and a fell region 114. The fell region 114 is a section of the weaving area 118 where the reed 110 strikes a weft yarn along a fell line during the operation of the loom 102. The fell line is the boundary beyond which the fabric 116 has been woven. The fabric inspection system 100 includes one or more image capturing devices 122 in communication with an image processor 124. Exemplary image capturing device 122 includes an analog or digital still image camera, a video camera, an optical camera, a laser camera, a laser or 3D image scanner, or any other device capable of capturing high resolution images of the weaving area 118. The image capturing device 122 can also be a high definition inbuilt camera of a communication device such as a computer, a laptop or a mobile phone. In an exemplary embodiment, to capture the images of high speed working loom, the camera required needs to be of very high speed, for example capturing more than 1000 frames/second. The image processor 124 is operable to receive and process data collected by the image capturing devices 122. The image processor 124 can be a server computer, a client user computer, a personal computer (PC), a tablet PC, a laptop computer, a desktop computer, a mobile phone, a control system and a network router, switch or bridge. Alternatively, the image processor 124 can be software application running on a virtual cloud environment. An output mechanism 126 such as a visual display unit associated with the image processor 124 may provide information to a user regarding the functioning of the loom 102 and upon detection of any fault. The information may be provided in form of images, graphical representations, numbers or text, and can relate to measurement data, statistical data, etc. The output mechanism 126 may also display an alert or a flag in case any deviation from the normal operation of the loom 102 is detected. It is noted that such a configuration of the on-loom fabric inspection system 100 may be operable to monitor the weaving area 118 during operation of the loom 102. Accordingly, a computer may be connected to the loom 102 and operable to stop the loom 102 or otherwise adjust the loom 102 settings in response to data gathered from the monitored weaving area 118.

Figure 2:
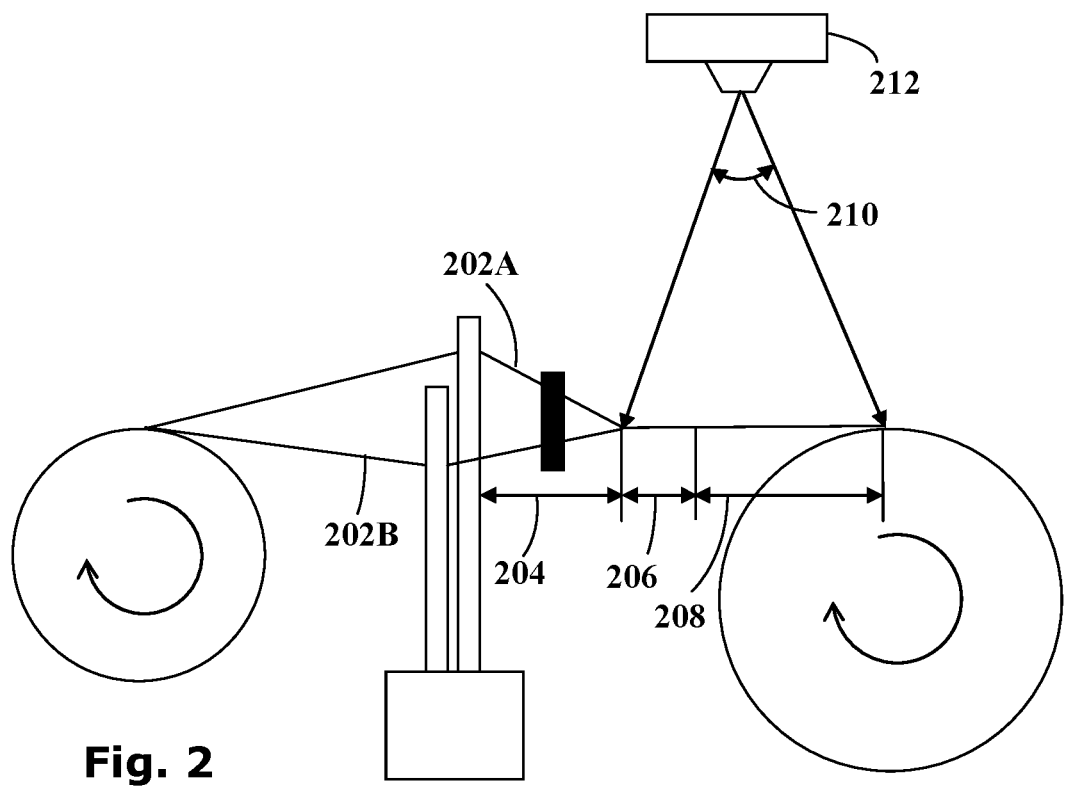
Figure 3:
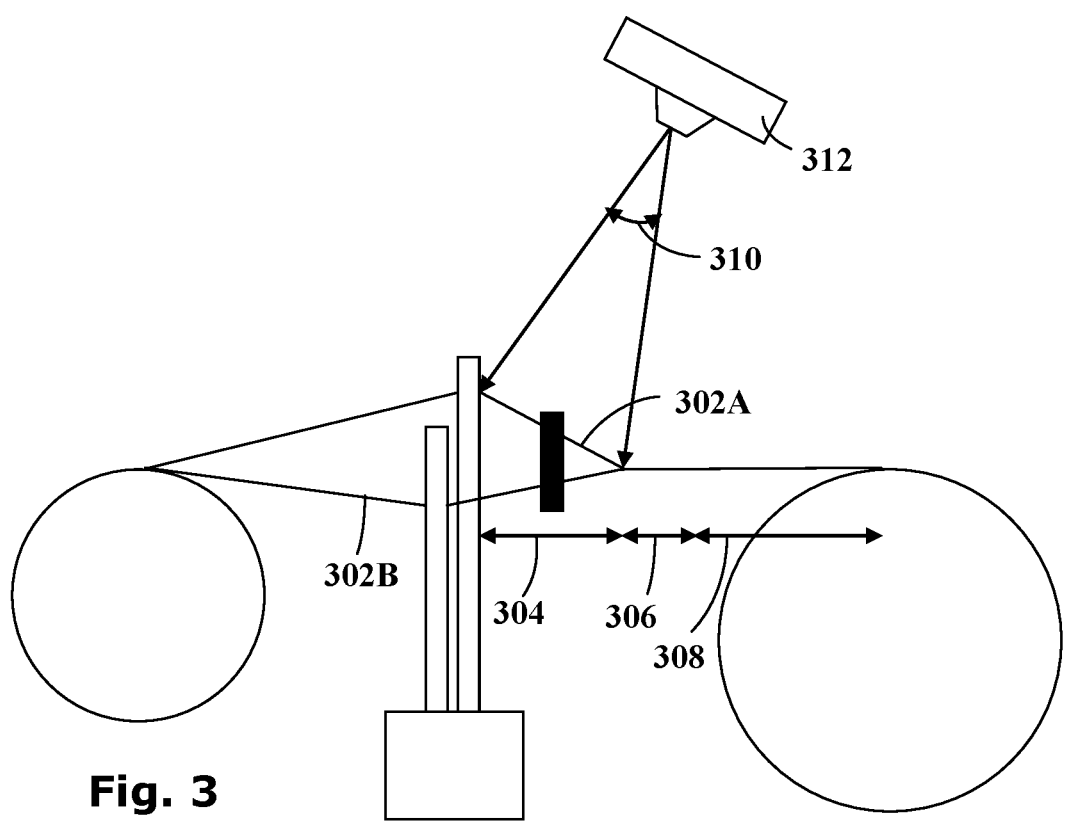

Conventionally, the on-loom fabric inspection system 100 captures the images of the weaving area 118 when the heald frames 108A and 108B are separate. In such a state, since the warp yarns 112 and the fell region 114 are not coplanar with each other, it is not possible to focus on both the warp yarns 112 in the shed and the fell region 114. Therefore, the object distance of image capturing device 122 needs to be adjusted to capture images of either warp yarns 112 or the fell region 114. FIG. 2 illustrates an exemplary embodiment where the image capturing device 212 is focused to take images of the fell region 206 and the region 208 of the newly woven fabric. In this case the image capturing device 212 cannot capture the images of the warp yarns 202A, 202B in the shed region 204. FIG. 3 illustrates another exemplary embodiment where the image capturing device 312 is focused to take images of the warp yarns 302A, 302B in the shed region 304. In this case the image capturing device 312 cannot capture the images of the fell region 306 and the region 308 of the newly woven fabric.

As a remedial measure, multiple image capturing devices focused on different regions 204, 206, 208 (or 304, 306, 308) may be used. However, this increases the cost and time for separate analysis of the images.

Figure 4:
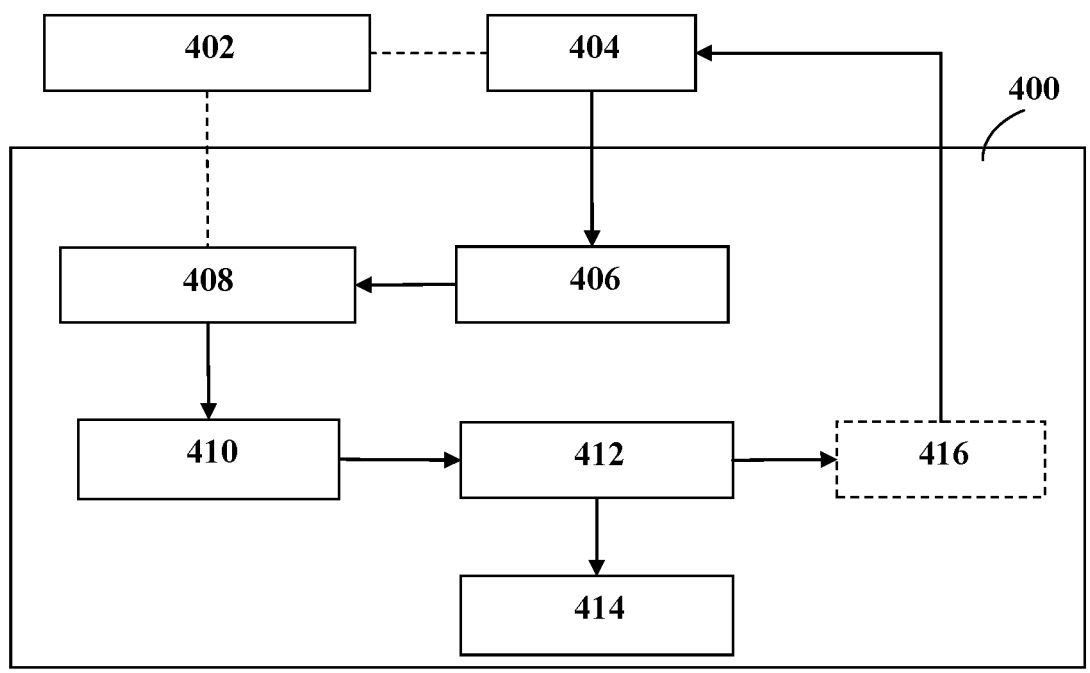

Reference is now made to the block diagram of FIG. 4, which represents the main components of an on-loom fabric inspection system 400 according to the invention. The system 400 may identify faults during the process of fabric manufacture, thereby enabling early detection or prevention of fabric defects. On-loom systems 400 such as described herein may serve as a cost-effective tool for providing continuous monitoring of woven textiles during production and may provide an industry standard for quality control of such fabrics.

The on-loom fabric inspection system 400 includes an image-capture trigger-mechanism 406, an image capturing device 408, an image processor 410, a controller 412 and an output mechanism 414. The image-capture trigger-mechanism 406 is configured to trigger the image capturing device 408 based on a required condition. The image capturing device 408 is configured to collect image data from a weaving area 402 of a loom 404 and to transfer this data to the image processor 410.

Various types of image capturing device 408 may be used which suits the requirement. Exemplary image capturing device 408 includes an analog or digital still image camera, a video camera, an optical camera, a laser camera, a laser or 3D image scanner, or any other device capable of capturing high resolution images of the weaving area 402. The image capturing device 408 can also be a high definition inbuilt camera of a communication device such as a computer, a laptop or a mobile phone. In an exemplary embodiment, to capture the images of a high speed working loom, the camera required needs to be of very high speed, like capturing more than 1000 frames/second. Further, an array camera or the like may be used having a resolution suitable to detect individual yarns within woven fabric. Resolution of the image capturing device 408 may be selected according to the cost and nature of the inspected fabric. The resolution may be less than 1 millimeter, e.g., around 0.1 millimeter as required.

The image-capture trigger-mechanism 406 may include a detector or sensor connected to the loom 404 and configured to detect the movement of heald frames 508A and 508B (shown in FIG. 5) of the loom 404. Accordingly, the image capturing device 408 may be triggered by the detector when the required condition is met for the heald frames. An exemplary detector may include a mechanical sensor, an electrical sensor, or an optical sensor. It should be noted that the scope of the invention should not be limited with the exemplary detectors described above and any other detector which can detect the motion of the heald frames can be used for the purpose.

In another embodiment, the image-capture trigger-mechanism 406 may additionally or alternatively include a timer such as a stroboscopic light or lamp which can be timed to produce a flash of light when the required condition is met for the heald frames.

In still other embodiments, the image-capture trigger-mechanism 406 may additionally or alternatively include a receiver in communication with the loom 404 and configured to receive output signals from an encoder of the loom engine. For example, a communication cable may be connected between an output terminal of the loom 404 and an input terminal of the image-capture trigger-mechanism 406. Accordingly trigger signals may be sent when the required condition is met, for example the image-capture trigger-mechanism 406 may receive a pick signal indicating that the picking process has been initiated and the picking signal may serve as a trigger signal for the image capturing device 408.

The image data collected by the image capturing device 408 is sent to the image processor 410 which may analyze the received image data and identify irregularities indicative of weaving faults. Various image processors 410 may be used with the system 400. A processor, such as a computer, a field programmable gate array (FPGA), an application specific integrated circuit and a microprocessor may be selected to provide image processing at sufficiently fast rate. The processing rate may be fast enough to allow each frame imaged by the image capturing device 408 to be analyzed in real time. Optionally, the image processor 410 may be operable to segment each frame and to analyze each frame segment separately and possibly with individual sampling rates. Exemplary image processor 410 includes a server computer, a client user computer, a personal computer (PC), a tablet PC, a laptop computer, a desktop computer, a mobile phone, a control system and a network router, switch or bridge. Alternatively, the image processor 410 can be a software application running on a virtual cloud environment.

The controller 412 is provided to respond to the detection of weaving faults. The controller 412 may respond, for example, by outputting data to the output mechanism 414. The output mechanism 414 such as a visual display unit associated with the image processor 124 may provide information to a user regarding the functioning of the loom 102 and upon detection of any fault. The information may be provided in form of images, graphical representations, numbers or text, and can relate to measurement data, statistical data, etc. The output mechanism 414 may also display an alert or a flag in case any deviation from the normal operation of the loom 404 is detected. The output mechanism 414 may also comprise a database to store the processed data of images. Where required, the controller 412 may be further operable to activate an override switch 416 to stop or otherwise adjust the loom 404 in response to the detection of defects. The override switch 416 may be an actuator or any other system which suits the requirement.

In one of the embodiments of the present invention, the image-capture trigger-mechanism 406 is conditioned to trigger the image capturing device 408 when the heald frames 508A and 508B (shown in FIG. 5) are aligned with each other and trigger the image capturing device 408 at that instance to capture images of the weaving area 402. In such a situation, the warp yarns in the shed are coplanar with the fell region and the newly woven fabric.

Figure 5:
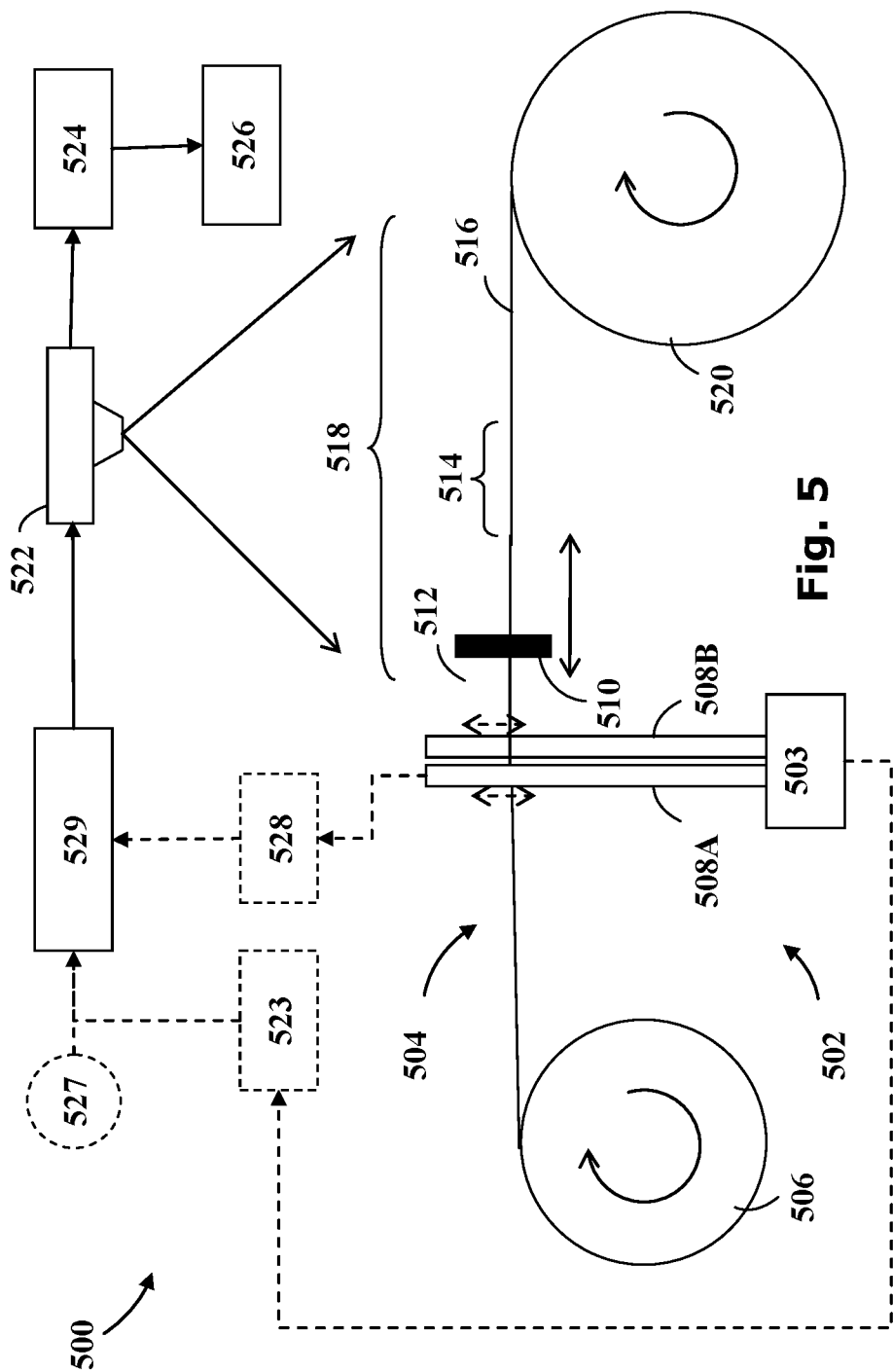

Reference is now made to FIG. 5 which shows a schematic side view of an exemplary configuration of a fabric inspection system 500 according to the invention, integrated onto a loom 502.

The on-loom fabric inspection system 500 includes an imaging device 522, an image-capture trigger-mechanism 529, an image processor 524, optionally a detector 528 and an output mechanism 526. The image-capture trigger-mechanism 529 is configured and operable to trigger said imaging device 522 to capture an image at a required instant during the weaving cycle, and the image processor 524 is configured and operable to receive data from said imaging device 522 and further to detect irregularities in said data.

The configuration of the loom 502 of FIG. 5 is similar to FIG. 1 with the exception that the heald frames 508A and 508B are depicted at the same level and aligned with each other. Upper and lower warp yarns in a shed 512 are in the same plane as a fell region 514 of a cloth and a newly woven fabric 516. The capturing of images of weaving area 518 enables a single object distance of image capturing device 522 to be used to image both regions, the shed region 512 and the fell region 514, allowing irregularities to be detected in both. A detector 528 is included in the system 500 for the purpose. Preferably, in each movement cycle (up and down) of the heald frames 508A and 508B, the images of weaving area 518 are captured twice in order to capture both sets of warp yarns. The detector 528 may variously comprise a sensor such as a mechanical sensor, an electrical sensor, an optical sensor and the like, as well as combinations thereof.

Figure 6A:
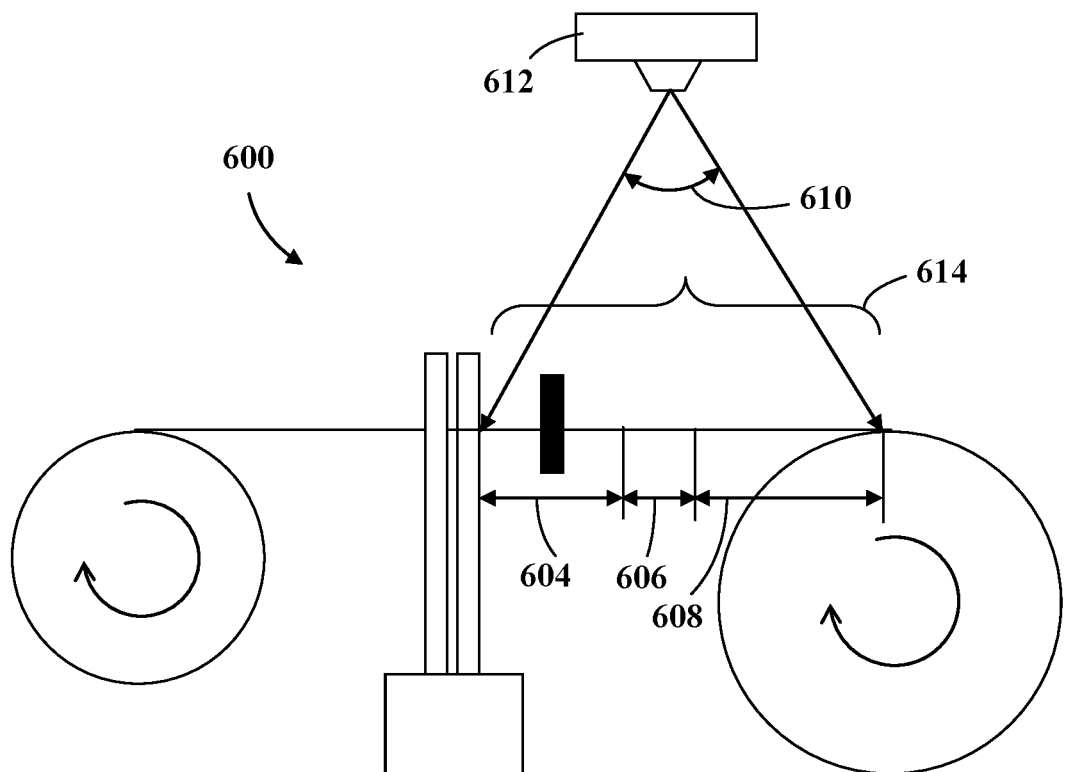

FIG. 6A illustrates the schematic side view of a fabric inspection system 600 with an image capturing device 612 focused to take images of a weaving area 614. Since upper and lower warp yarns in shed 604 are in same plane as fell region 606 and newly woven fabric 608, the image capturing device 612 can use a single depth of focus over a wide angle 610 to capture the image of the complete weaving area 614.

Figure 6B:
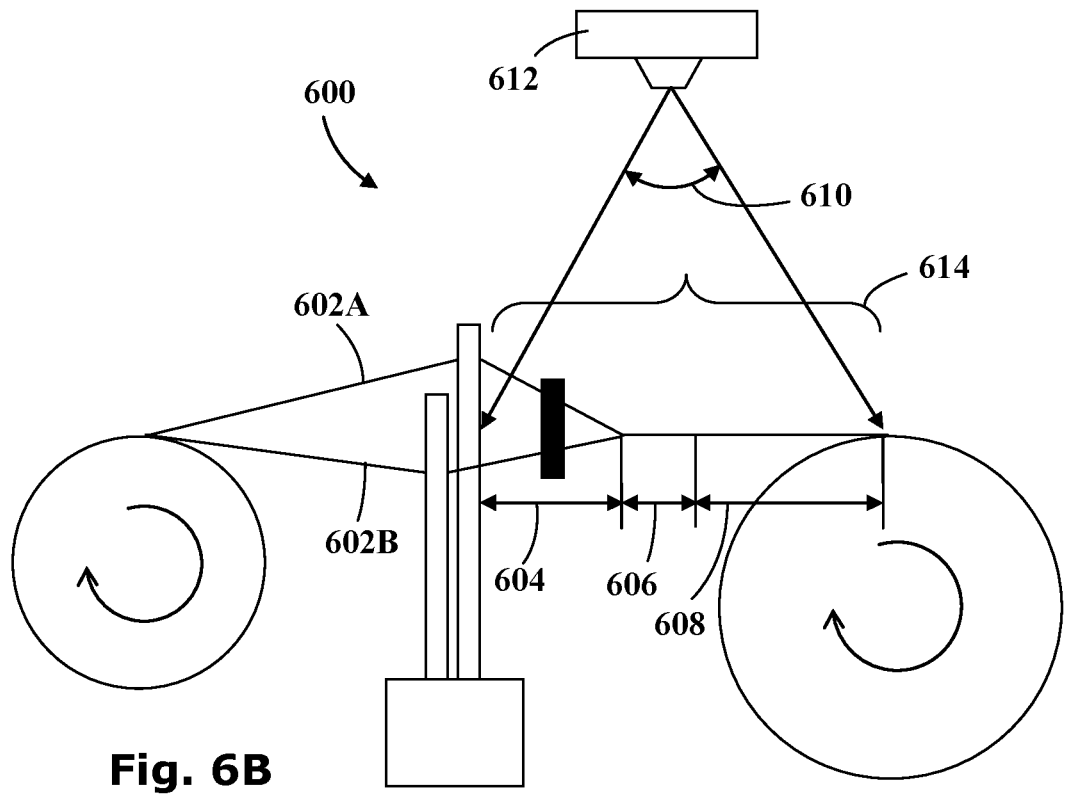

FIG. 6B illustrates another configuration of the fabric inspection system 600 in which the heald frames are separated so as to raise the upper warp yarns 602A and lower the lower warp yarns 604B, thereby creating the shed. It is particularly noted that where appropriate, images may be additionally or alternatively captured in this configuration. Accordingly, the image capturing device 612 may image only the upper warp yarns 602A, thereby enabling the image processor 410 (shown in FIG. 4) to distinguish more readily between warp-risers and warp-sinkers along the fell-pick yarn.

Referring back to FIG. 5, in still another alternative embodiment, an image-capture trigger-mechanism 529 may optionally trigger the image capturing device 522 in other ways. For example, an image-capture trigger-mechanism 529 may include a timer 527 such that the shutter of the image capturing device 522 can be set for a fixed time to capture images of the weaving area 518. The shutter timing can be set to the instance when the heald frames 508A and 508B are aligned with each other. The images of the weaving area 518 are captured at that instance without the need for being triggered by the detector 528.

Additionally or alternatively, the image-capture trigger-mechanism 529 may further include a receiver 523 in communication with the loom 502 and configured to receive output signals from an encoder of the loom engine 503.

Figure 7:
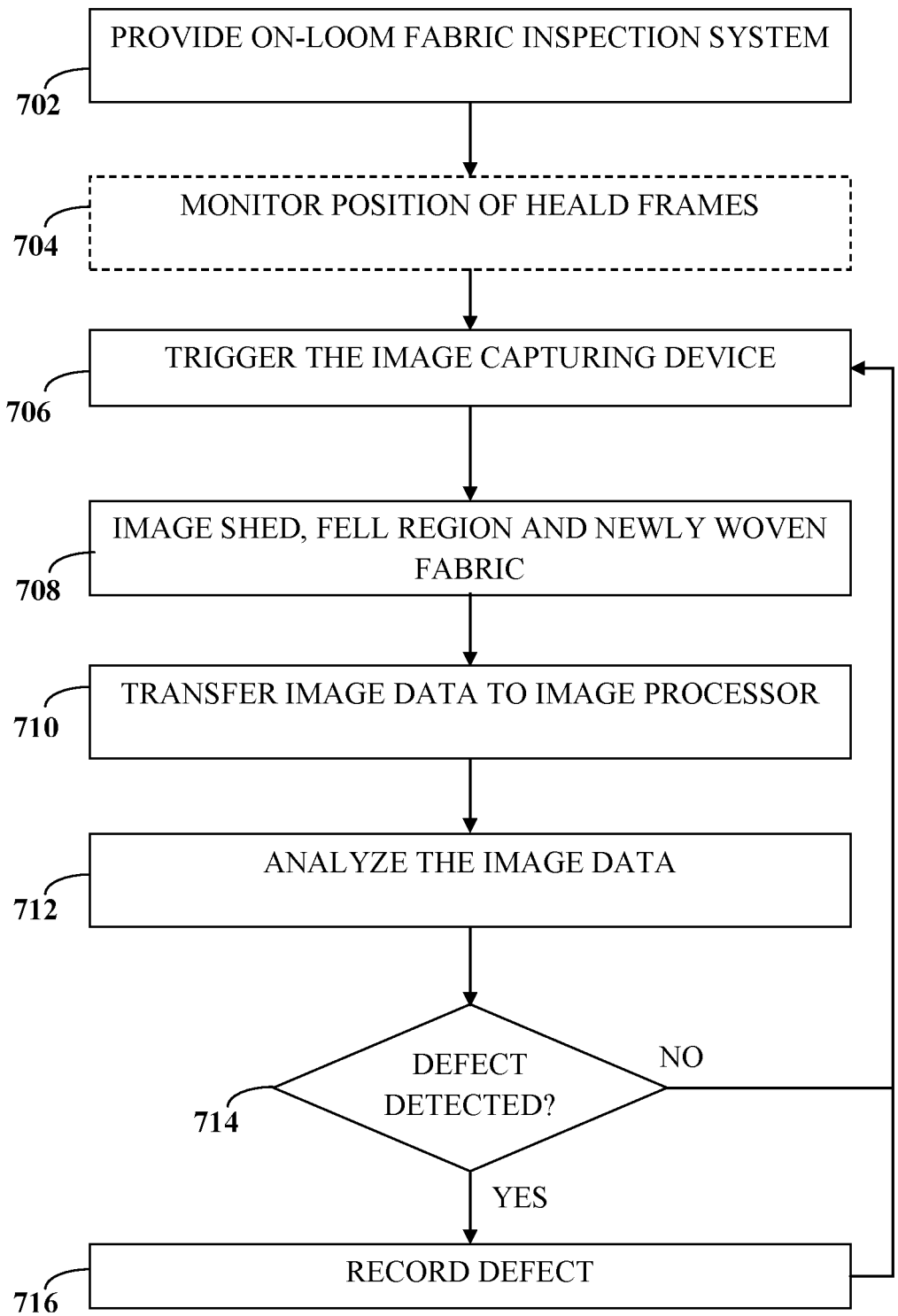

Reference is now made to the flowchart of FIG. 7, which illustrates exemplary method steps of an embodiment of the present invention for detecting defects in a woven fabric using the on-loom fabric inspection system 500 (shown in FIG. 5).

The on-loom fabric inspection system 500 is provided at step 702. During the operation of the loom 502, optionally, at step 704, an image-capture trigger-mechanism 529, which may include a detector 528, may monitor the position of the heald frames 508A and 508B. The image capturing device 522 is triggered at a required point in the cycle, for example when the heald frames 508A and 508B are aligned with each other, at step 706. The image capturing device 522 then collects images of the weaving area 518, including the shed 512, the fell region 514 and the newly woven fabric 516, at step 708. Image data is transferred to the image processor 524 at step 710. The image processor 524 analyzes the received image data for irregularities and faults at step 712. If an irregularity detected in the image data indicates at step 714 that a weaving fault has occurred, then this fault is recorded on the output mechanism 526 at step 716. The process may continue by another image being collected and analyzed, such that the process may be repeated.

It is noted that the recordation of the weaving fault may involve a simple fault count such as using a penalty point system such as the four-point for example. Alternatively more precise data relating to the types of faults detected and their statistical distribution for example may be recorded.

Figure 8:
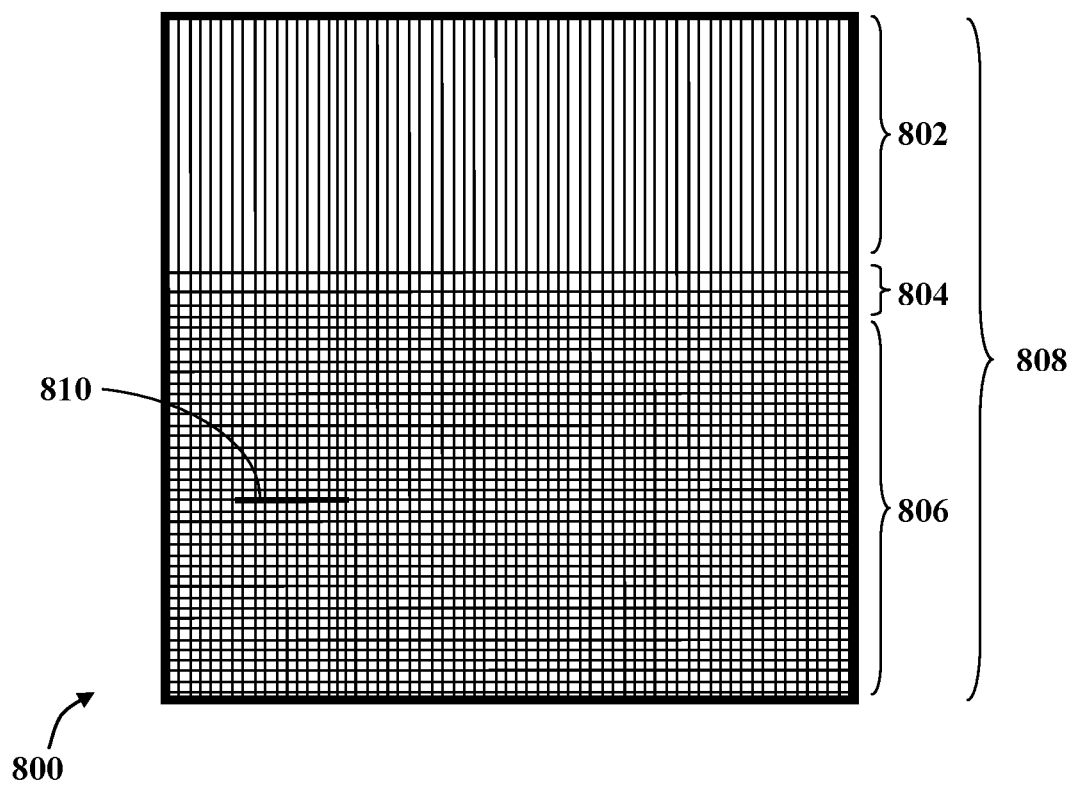

FIG. 8 shows the representation of one frame 800 of a weaving area 808 imaged by the image capturing device 522 of the on-loom fabric inspection system 500 (cf. FIG. 5). The frame 800 shows the shed 802, the fell region 804 and the newly woven fabric 806. An oil spot, caused by a soiled section 810 propagating along the newly woven fabric 806 is also shown. The image frame 800 is processed by the image processor 524 to detect the soiled section 810 and appropriate measure can be taken by a loom operator to resolve the issue.

Weaving faults may occur in any of these areas of the frame 800 and may be detected using the on-loom fabric inspection system 500. For example, slubs, missing yarns, end outs and the like may be detected in the shed 802 and fell region 804 whereas oil spots, loom stop marks, start marks and the like may be detected in the newly woven fabric 806.

Various faults occurring in the weaving area 808 during manufacture may cause defects in the finished fabric. These include slubs, holes, missing yarns, yarn variation, end out, soiled yarns, wrong yarn faults, oil spots, loom-stop marks, start marks, thin place, smash marks, open reed, mixed filling, kinky filling, mixed end, knots, jerk-in, dropped picks, broken picks, double picks, double ends, drawbacks, burl marks and the like. It should be noted that the listed faults are exemplary in nature and should not limit the scope of the invention.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like intended to include all such new technologies a priori.

The terms "comprises", "comprising", "includes", "including", "having" and their conjugates as used herein mean "including but not limited to" and indicate that the components listed are included, but not generally to the exclusion of other components. Such terms encompass the terms "consisting of" and "consisting essentially of".

As used in this specification, the singular indefinite articles "a", "an", and the definite article "the" should be considered to include or otherwise cover both single and plural referents unless the content clearly dictates otherwise. In other words, these articles are applicable to one or more referents. For example, the term "a compound" or "at least one compound" may include a plurality of compounds, including mixtures thereof. As used in this specification, the term "or" is generally employed to include or otherwise cover "and/or" unless the content clearly dictates otherwise.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

It is appreciated that certain features of the invention, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the invention has been described in conjunction with specific embodiments thereof, it is evident that other alternatives, modifications, variations and equivalents will be apparent to those skilled in the art. Accordingly, it is intended to embrace all such alternatives, modifications, variations and equivalents that fall within the spirit of the invention and the broad scope of the appended claims. Additionally, the various embodiments set forth hereinabove are described in terms of exemplary block diagrams, flow charts and other illustrations. As will be apparent to those of ordinary skill in the art, the illustrated embodiments and their various alternatives may be implemented without confinement to the illustrated examples. For example, a block diagram and the accompanying description should not be construed as mandating a particular architecture, layout or configuration.

The presence of broadening words and phrases such as "one or more," "at least," "but not limited to" or other like phrases in some instances shall not be read to mean that the narrower case is intended or required in instances where such broadening phrases may be absent.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting. The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. An on-loom fabric inspection system (500) comprising:
at least one imaging device (522) configured to collect images of at least one section of a weaving area (518) of a loom (502);
at least one image-capture trigger-mechanism (529) operable to trigger said imaging device (522) to capture an image at a required instant during the weaving cycle; and
at least one image processor (524) configured and operable to receive data from said imaging device (522) and further to detect irregularities in said data,
wherein
said image-capture trigger-mechanism (529) comprises at least one heald detector (528) configured and operable to detect relative positions of at least two heald frames (508A, 508B) of said loom (502).

2. The on-loom fabric inspection system of claim 1 wherein said heald detector (528) comprises at least one sensor selected from the group consisting of: mechanical sensors, electrical sensors, optical sensors and combinations thereof.

3. The on-loom fabric inspection system of claim 1 wherein said image-capture trigger-mechanism (529) comprises at least one receiver (523) operable to receive output signals from the loom (502).

4. The on-loom fabric inspection system of claim 1 wherein said required instant coincides with the moment that at least two heald frames (508A, 508B) are aligned.

5. The on-loom fabric inspection system of claim 1 wherein said required instant coincides with the moment that the shed (112) is open.

6. The on-loom fabric inspection system of claim 1 wherein said imaging device (522) comprises a camera having an object distance equal to the optical distance from said camera to a plane of a fell region (514) of said weaving area (518).

7. The on-loom fabric inspection system of claim 1 wherein said imaging device (612) comprises a camera having an object distance equal to the optical distance from said camera to an upper warp yarn (602A) plane of a shed region (604) of said weaving area (614).

8. The on-loom fabric inspection system of claim 1 wherein said section of the weaving area (518) comprises all of a shed region (512), a woven fabric region (516) and a fell region (514).

9. The on-loom fabric inspection system of claim 1 further comprising an output mechanism (526) operable to provide information to a user regarding functioning of the loom (502).

10. The on-loom fabric inspection system of claim 1 further comprising an output mechanism (526) operable to provide information selected from a group consisting of images, graphical representations, numbers or text pertaining to functioning of the loom (502).

11. The on-loom fabric inspection system of claim 1 wherein said image-capture trigger-mechanism (529) comprises at least one timer (527) operable to synchronize image capture with said weaving cycle.

12. The on-loom fabric inspection system of claim 11 wherein said timer (527) comprises a stroboscope timed to expose the weaving area at the required instant in the weaving cycle.

13. A method for inspecting woven fabric comprising:
providing at least an on-loom fabric inspection system (500) including:
at least one imaging device (522) configured to collect images of at least one section of a weaving area (518) of a loom;
at least one image-capture trigger-mechanism (529) comprising at least one heald detector (528); and
at least one image processor (524);
selecting a required instant during the weaving cycle;
said at least one heald detector (528) detecting relative positions of at least two heald frames (508A, 508B) of said loom (502);
said at least one image-capture trigger-mechanism (529) triggering said imaging device (522) at said required instant during the weaving cycle;
said at least one imaging device (522) capturing an image of at least one section of a weaving area (518) at said required instant;
transferring image data to said at least one image processor (524); and
said at least one image processor (524) analyzing said image data for irregularities indicative of weaving faults.

14. The method of claim 13 further comprising providing a quality index for a batch of woven fabric (520).

15. The method of claim 13 further comprising adjusting said loom (502) to correct said weaving faults.

16. The method of claim 13 further comparing deviation of weft-spacing in the fell region (514) from a desired weft-spacing function.

17. The method of claim 13 further comprising said heald detector (528) detecting that at least two heald frames (508A, 508B) are aligned.

18. The method of claim 13 further comprising said heald detector (528) detecting that at least two heald frames (508A, 508B) are separate, indicating that the shed region (512) is open.

19. The method of claim 13 wherein said required instant coincides with the moment that at least two heald frames (508A, 508B) are aligned.

20. The method of claim 13 wherein said required instant coincides with the moment that the shed region (512) is open.

\* \* \* \* \*